United States Patent [19]
van Huet

[11] Patent Number: 4,961,683
[45] Date of Patent: Oct. 9, 1990

[54] DEVICE FOR ALIGNING AND LIFTING BLOCKS IN KILN CARS

[75] Inventor: Paul J. G. H. van Huet, Pannerden, Netherlands

[73] Assignee: Machinefabriek De Oude Rijn Pannerden B.V., Netherlands

[21] Appl. No.: 278,707

[22] Filed: Dec. 1, 1988

[30] Foreign Application Priority Data

Dec. 7, 1987 [NL] Netherlands .................. 8702941

[51] Int. Cl.⁵ ............................................. B66C 1/46
[52] U.S. Cl. ................................ 414/783; 414/931; 414/799; 414/789.1; 414/792.9; 294/63.2
[58] Field of Search ............... 414/751, 788.9, 789.1, 414/792.9, 788, 799, 922, 931, 791.3, 791.4, 791.6, 754, 783; 294/62, 63.2, 98.1

[56] References Cited

U.S. PATENT DOCUMENTS

| | | | |
|---|---|---|---|
| 3,667,622 | 6/1972 | Kamphnes et al. | 414/792.9 X |
| 3,716,264 | 2/1973 | Pearne et al. | 414/931 X |
| 4,119,217 | 10/1978 | Jones | 414/931 X |
| 4,790,587 | 12/1988 | Stoll | 294/63.2 X |

FOREIGN PATENT DOCUMENTS

| | | | |
|---|---|---|---|
| 3532551 | 3/1987 | Fed. Rep. of Germany | 294/63.2 |
| 0814757 | 3/1981 | U.S.S.R. | 414/931 |

*Primary Examiner*—Robert J. Spar
*Assistant Examiner*—John Vanden Bosche
*Attorney, Agent, or Firm*—Skjerven, Morrill, MacPherson, Franklin & Friel

[57] ABSTRACT

The invention aligns rows of blocks extending parallel to one another which are supported by a kiln car. The device provided holds the kiln car in a desired position relative to the device, then an up-and-down movable lifting mechanism provided with clamps is inserted between the rows of blocks, and the device adjusts the lifting mechanism transversely to the longitudinal direction of the rows of blocks until it strikes an adjustable fixed stop then inflates its clamps to thereby align the blocks. The blocks once clamped may be lifted off the car by the lifting mechanism, so that the cart can be treated, i.e. cleaned. The blocks are then replaced on the car in same position from which they were lifted, still aligned. The clamps are then released and the lifting mechanism is removed from between the newly aligned blocks.

10 Claims, 7 Drawing Sheets

DEVICE FOR ALIGNING AND LIFTING BLOCKS IN KILN CARS

FIELD OF THE INVENTION

The invention relates to a method for aligning rows of blocks supported by a kiln car and extending parallel to one another.

BACKGROUND OF THE INVENTION

A kiln car is used in baking bricks, whereby the bricks to be baked are stacked on rows of blocks supported by the car, after which the car is led through a kiln for baking of the bricks. After the bricks have been baked the bricks are usually removed from the car by lifting means provided with teeth which are inserted between the rows of blocks. In this connection it is important that the rows of blocks loosely supported by the kiln car always be in the correct position. In order to be able to ensure this, it is necessary that the rows of blocks be aligned regularly. To date, said aligning has been done by hand usually each row of blocks is aligned separately by means of a profile or the like which is laid along the row. Not only is this a time-consuming job, but it does not ensure that the various rows supporting a pack of bricks are all arranged parallel to one another and at the correct distance from one another.

SUMMARY OF THE INVENTION

According to the invention a method is provided for aligning rows of blocks supported by a kiln car and extending parallel to one another. Expandable clamping means in a fixed position relative to one another, are inserted between the rows of blcoks. The clamping means is then moved transversely in the longitudinal direction of the rows of blocks to a desired position relative to the kiln car. The clamping means is subsequently expanded to clamp the rows of blocks between the clamping means.

By means of the clamping means the blocks of the various rows of blocks are put in their correct position in a row and the rows in their correct position relative to one another. Blocks which are out of alignment will either be moved in one direction transversely to the longitudinal direction of the rows by the clamping means, or be moved in the opposite direction by expansion of the clamping means. The blocks will then always take positions which are correct for packs of bricks to be stacked thereon and correct relative to a lifting means by which a pack of bricks supported by the rows of blocks is removed from the car at an unloading station. Such an unloading station is generally provided with means for positioning the kiln car in a correct position relative to a removing means, so that the rows of blocks take a correct position then as well.

An efficient device for carrying out the above method is provided. The device is provided with means for blocking the kiln car in a desired position relative to the device, as well as with an up-and-down movable lifting mechanism. The lifting mechanism is provided with clamping means to be inserted between the rows of blocks. Means are also provided by which the lifting mechanism can be adjusted transversely to the longitudinal direction of the rows of blocks until it strikes an adjustable stop.

During use waste will collect on the kiln car, in particular grit from the bricks. For a good maintenance of the kiln cars it is desirable that said waste be removed from the kiln cars at regular intervals.

According to the invention this can be done in an efficient manner when use is made of a device which is provided with a frame along which a brush car is moved, and the brush car is equipped with brushing means for brushing clean at least certain parts of the kiln car.

The invention will be further explained hereinafter with reference to an embodiment of a device according to the invention diagrammatically illustrating in the accompanying figures.

DETAILED DESCRIPTION OF THE INVENTION

Figure 1A:
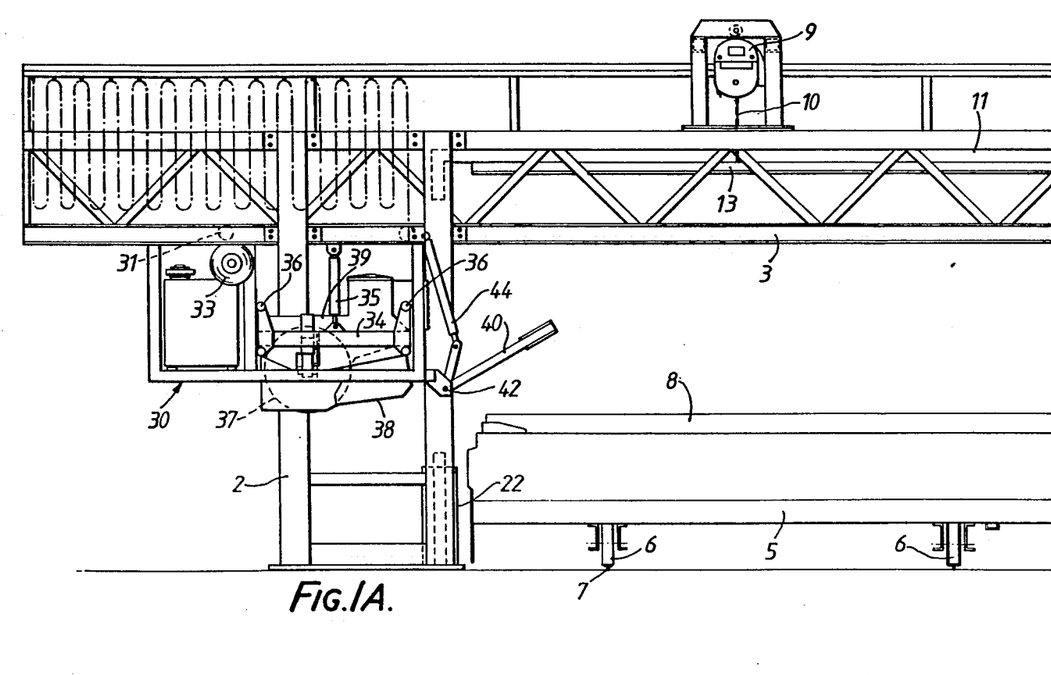
FIGS. 1A and 1B are two parts of a split view of an embodiment of a device according to the invention.
Figure 1B:
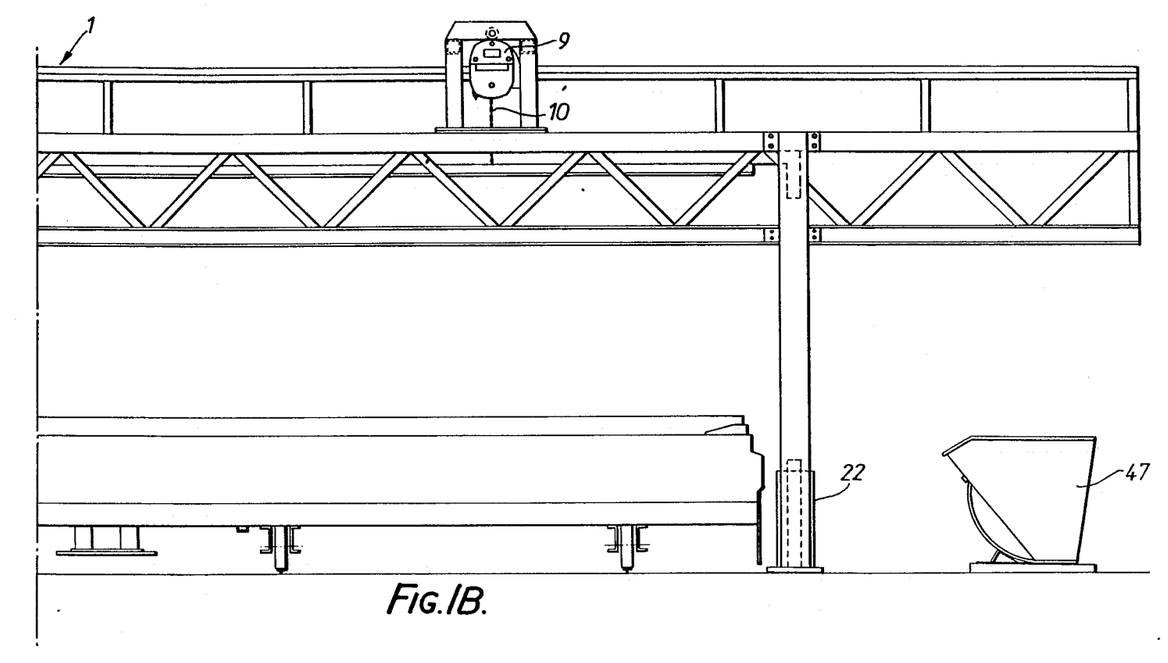
Figure 2:
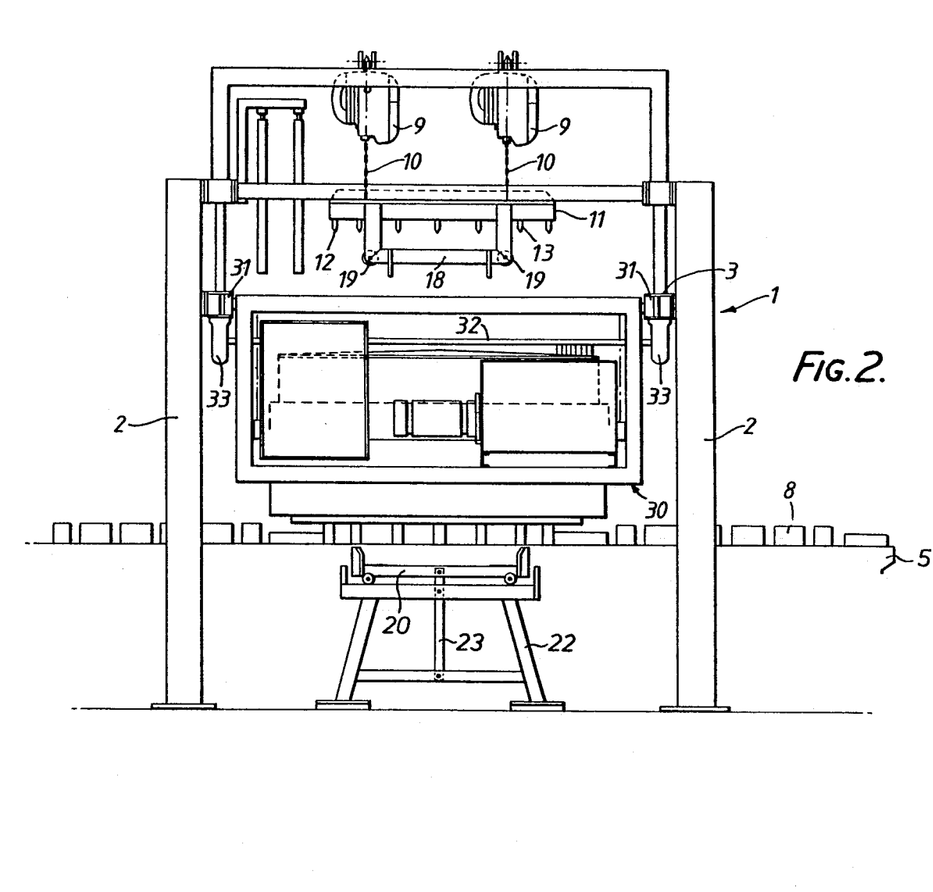
FIG. 2 is a side view of FIGS. 1A and 1B.

The device illustrated in FIGS. 1A, 1B, and 2 comprises a portal-shaped frame 1, which is provided with vertical columns 2 and horizontally extending beams 3 supported by said columns 2. Usual kiln cars 5, which are supported by travelling wheels 6, can be moved across rails 7 under the portal-shaped frame 1, as is illustrated in FIGS. 1A and 1B. Usually one or more groups of rows of blocks 8, extending perpendicularly to the direction of movement of the kiln car, are provided on such kiln cars. Each row of block 8 is thereby generally formed by a number of blocks lying loosely on the flat upper side of the kiln car and being in line with one another,. Each group of blocks serves to support a pack of bricks. Dependent on the number of groups of rows of blocks, one or more packs of bricks to be baked are stacked on the kiln car, after which the kiln car is moved through a kiln where the bricks are to be baked. After the kiln car has been moved out of the kiln, it is positioned opposite an unloading device. The pack or packs of bricks, then consisting of baked bricks, are successively lifted off the kiln car. After having passed said unloading device, and before new bricks to be baked are placed on the kiln car, the kiln car is first moved through the device according to the invention, to be further described hereinafter, for the treatment of the kiln car to be further described hereinafter.

As is further illustrated in FIGS. 1A, 1B, and 2, four winches 9 are arranged side by side in pairs on the frame. A frame 11 is suspended from winch ropes or chains 10 of said winches, which frame 11 can be moved up-and-down by means of the winches.

To said frame 11 there is fixed a fixed clamping strip 12 which extends in the longitudinal direction of the frame, i.e., perpendicularly to the longitudinal direction of the frame, i.e., perpendicularly to the longitudinal direction of the rails 7. As is apparent from FIGS. 2 and 3, said fixed clamping strip 12 is arranged near one side of the frame 11.

Figure 5:
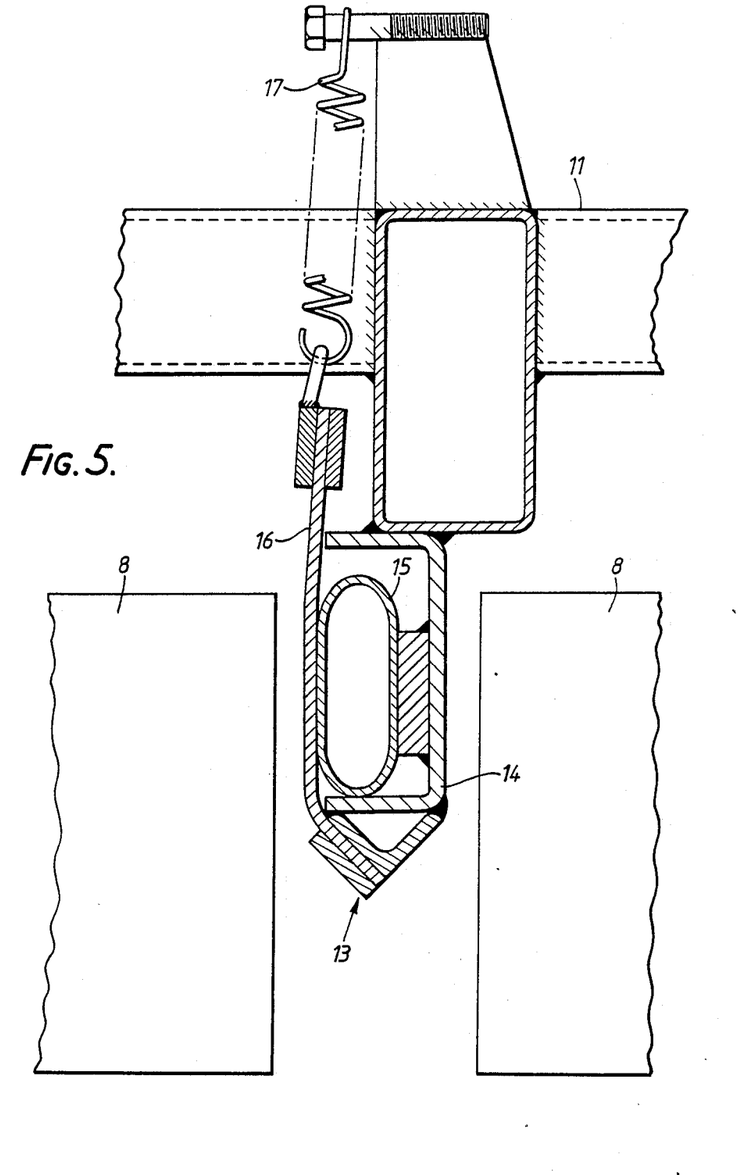
FIG. 5 is a larger-scale section of a clamping means inserted between two rows of blocks.
Figure 6:
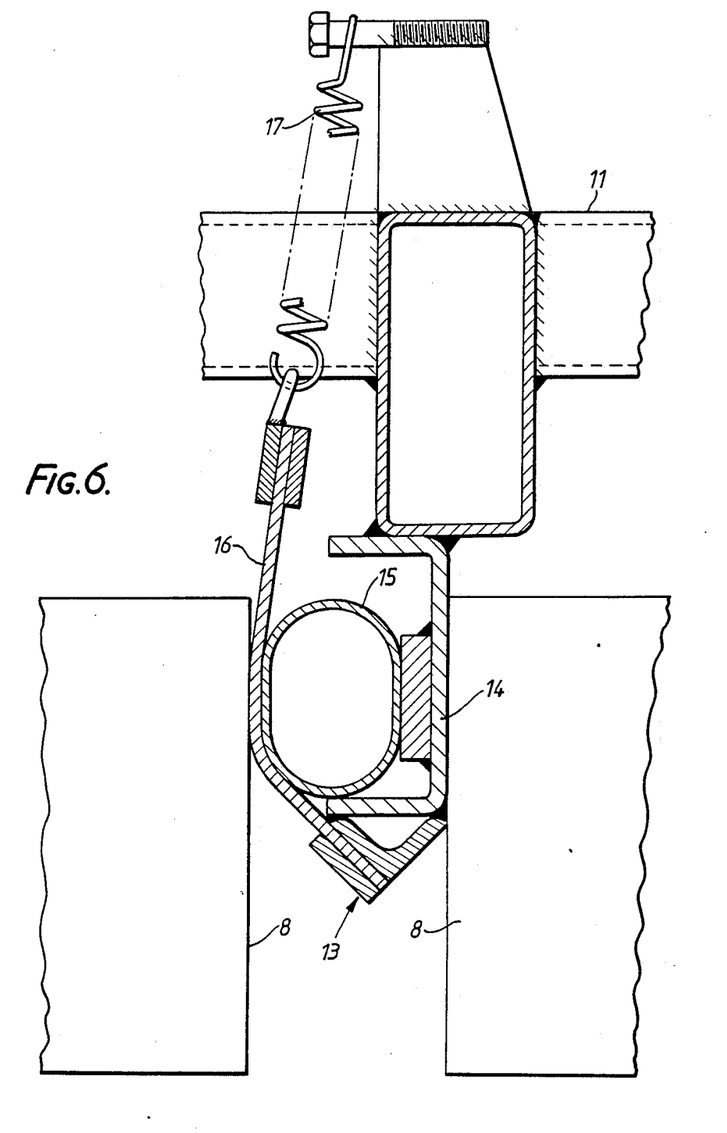
FIG. 6 is a section corresponding with FIG. 5, whereby the clamping means is illustrated expanded.

Beside the fixed clamping strip 12 a number of expandable clamping strips, six in the illustrated embodiment, are fixed to the frame, the construction of said clamping strips 13 is illustrated in FIGS. 5 and 6.

As is apparent from FIGS. 5 and 6 that an expandable clamping strip 13 comprises a beam having a U-shaped section, which beam 14 extends in the longitudinal direction of the frame 11. In said beam 14 having a U-shaped section there is provided a hose 15 extending in the longitudinal direction of the beam. The hose 15 is thereby enclosed between the beam 14 and a plate 16 made of a flexible material and extending in the longitudinal direction of the frame and along the open side of the beam 14, which plate 16 is fixed near its bottom end, seen in the FIGS. 5 and 6, to the bottom side of the beam 14 and is suspended near its upper side from a number of springs 17 supported on the frame 11. The various hoses 16 of the expandable clamping strips 13 can be inflated by means of means not shown, whilst means (not shown either) are present to let the air escape from the hoses 15 again.

To the ends of the frame 11 there are fixed U-shaped carriers 18 which are provided with guide rolls 19 in the corner points, near their bottom sides. As is illustrated in particular in FIG. 3, said guide rolls 19, provided at the ends of the frame 11, are accommodated in a U-shaped frame part 20 which is constructed such that in the lowermost position of the frame 11 the guide rolls 19 have a close fit between the upwardly extending legs of the U-shaped frame part 20.

Figure 3:
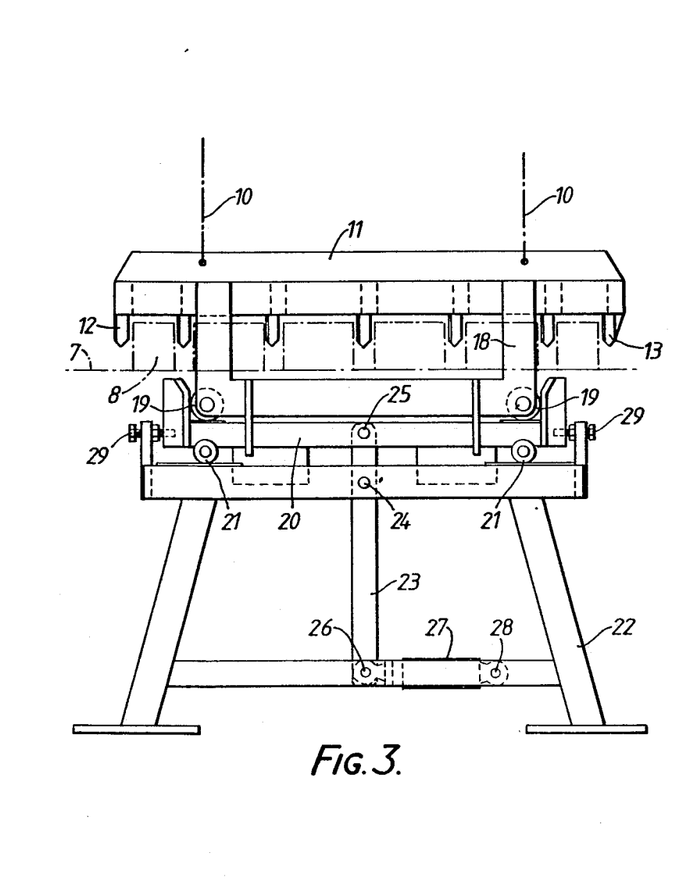
FIG. 3 is a larger-scale illustration of a part of the mechanism for aligning the rows of blocks.
Figure 4:
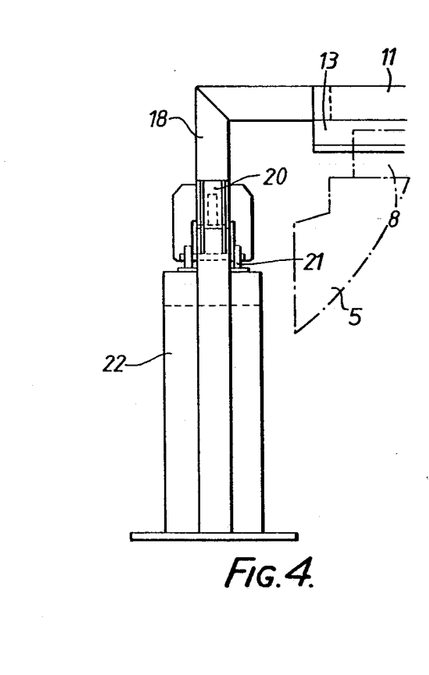
FIG. 4 is a side view of a part of FIG. 3.

Each frame part 20 is movably supported, by means of rolls 21, by a stand 22 arranged near the relevant end of the device. A lever 23 is pivotally connected between its ends to said stand 22 by means of a horizontally extending pin 24. The upper end of the lever 23 is pivotally coupled, by means of a pin 25 extending parallel to the pin 24, to the movable U-shaped frame part 20. The bottom end of the lever 23 is pivotally connected by means of a pin 26 extending parallel to the pins 24 and 25, to a setting cylinder 27, which is also pivotally coupled to the pins 24 and 25, to a setting cylinder 27, which is also pivotally coupled to the stand 22 by means of a pin 28 extending parallel to the pin 26.

It will be apparent that the U-shpaed frame parts 20 supported by the stands 22 can be moved to and from in a direction parallel to the direction of movement of the kiln cars by means of the setting cylinders 27. The stands 22 are provided with preferably adjustable stopping means 29 in order to limit the movement of the U-shaped frame parts relative to said stands 22.

When the kiln car 5 is moved under the portal, the kiln car 5 can be locked in a desired position relative to the device illustrated in FIGS. 1A, 1B, and 2 by means of positioning devices known by themselves (not shown). Then the frame 11 with the clamping means 12, 13 can be moved downwards from the uppermost position illustrated in FIGS. 1A, 1B, and 2, such that the clamping means 12, 13 come to lie on both sides of the various rows of blocks 8, which belong to a single group supporting a pack of bricks, as is illustrated in particular in FIG. 3. When the clamping means 12, 13 are being inserted between rows of blocks 8 belonging to one group, the hoses 15 are not inflated, so that the clamping means 12, 13 have some play in the slots located between the rows of blocks 8 located side by side. In the lowermost position of the lifting mechanism (formed by the frame 11 and the clamping means 12, 13), the rolls 19 also forming part of the lifting mechanism are supported by the U-shaped frame parts 20.

When the lifting mechanism supporting a group of rows of blocks 8 is supported by the movable frame parts 20, said frame parts can, e.g., be pressed, by means of the setting cylinders 27, against the stops 29 located on the right-hand side of the blocks 8 as seen in FIG. 3. Said stops 29 being adjusted such that when the frame parts 20 are in contact with said stops 29, the blocks of the rows of blocks 8 which butt against the rigid beams 14 or the fixed clamping strip 12 can take up their correct position relative to the kiln car. Any misaligned blocks, which had moved from their correct position to the left, as seen in FIG. 3, are thereby moved back to the right against the beams 14 or the fixed clamping strip 12.

Then the hoses 15 can be inflated, so that the blocks of the various rows of blocks 8 are clamped between the clamping means. The blocks are pressed against the fixed clamping strip 12 on the sides of the beams 14 remote from the hoses 15. Any blocks which are out of alignment, which had moved from their correct position to the right, as seen in FIG. 3, are thereby pressed back to the left again. It will be apparent that thus all blocks of a row of blocks will have been aligned again and the various rows of blocks will be aligned at the correct distance from and parallel to one another.

In the expanded position of the clamping means 13, the blocks can also be lifted off the kiln car 5.

As a result of the above movement of the frame parts 20 in the direction of the stops 29, the frame 11 supporting the clamping means 13 will no longer be perpendicularly below the winches, but this small lateral deviation can easily be taken up by the cables or the chains 10.

Similarly, when the frame 11 is moved downwards later after possibly having lifted the rows of blocks, said frame 11 will be guided into its correct end position again by means of the frame parts 20. In reaching end position and placing the rows of blocks 8 on the kiln car 5, the frame 11 will have been moved sideways somewhat relative to its suspended position perpendicularly below the winches 9.

When the rows of blocks 8 are supported on the kiln car 5 in their correctly aligned position (possibly after the rows of blocks 8 have been lifted off the kiln car 5), the air can be allowed to escape from the hoses 15, after which they will be pressed back from their inflated position (FIG. 6) to their compressed position (FIG. 5) by the plates 16 which are suspended by means of springs 17. When the frame 11 is then moved back again to its position directly perpendicularly below the winches 9 by means of the movable frame parts 20 and subsequently the lifting mechanism 11–13 is lifted, the rows of blocks 8 will be left behind on the kiln car 5 correctly aligned and in their correct position on the kiln car.

It will be apparent that instead of being equipped with inflatable hoses the clamping means may also be equipped with clamping means or the like which are mechanically expandable transversely to the longitudinal direction of the beams 14.

The device is further provided with a brush car 30 which is movable along the lowermost frame beams 3. The brush car 30 is supported by rolls 31 running on the lowermost frame beams 3. In the frame of the brush car 30 there is journalled a horizontal shaft 32 extending perpendicularly to the frame beam 3. The shaft 32 can be rotated in two different directions by means of a driving means (not shown). On the ends of the shaft 32 there are mounted tires 33 which are pressed against the lower side of the frame beams 3. It will be apparent that by rotating the shaft 32 in one or the other direction the brush car 30 can be moved to and from in the longitudinal direction of the frame beams 3.

The brush car 30 supports a frame 34, which is suspended in the brush car 30 by means of setting cylinders 35. The frame 34 is thereby movable up-and-down in vertical direction by means of setting cylinders 35. To guide the movement of the frame 34 in the frame of the brush car 30 the frame 34 is provided with guide rolls 36. The frame 34 supports a brush 37 which can be rotated about its axis of rotation, which extends horizontally and parallel to the rails 7, by means of a driving means. Beside the brush 37 there is arranged a receiving bin 38, which is open at its side directed towards the brush 37. Near its upper edge remote from the brush 37, the receiving bin 38 is pivotable relative to the frame of the brush car 30, by a setting means (not shown), about a pivot pin extending parallel to the axis of rotattion of the brush 37.

Near the upper side of the brush 37 there is a hood 39 with a dust-extracting unit connected thereto or accommodated therein.

Figure 7:
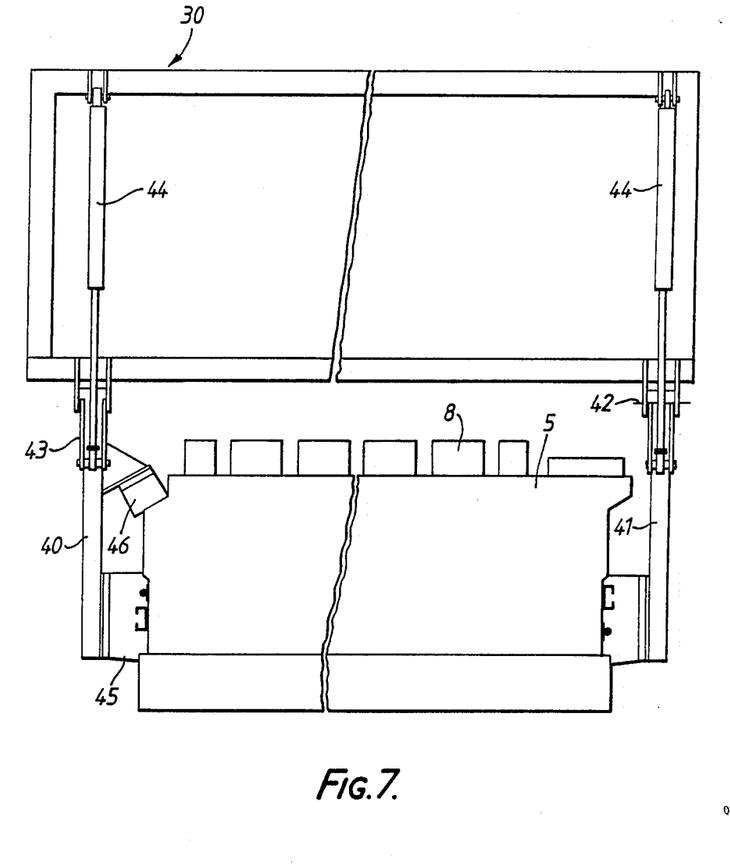
FIG. 7 is a diagrammatic view of parts of the brush car and a kiln car.

At the side of the frame of the brush car 30, seen in a direction perpendicular to the longitudinal direction of the rails 7, there are provided arms 40 and 41 respectively (FIG. 7). The arms 40 and 41 are pivotable relative to the frame of the brush car 30 about pivot pins 42 extending parallel to the rails 7. To the arms 40, 41 there are fixed upwardly extending arms 43. The ends of the arms 43 remote from the arms 40 and 41, respectively, are connected to setting cylinders 44, which are connected to the frame of the brush car 30 at their ends remote from the arms 43.

At the ends of the arms 40 and 41 there are provided brushes 45. Between its ends the arm 40 is further provided with an additional brush 46.

The arms 40 and 41 can be pivoted independently of each other, by means of the setting cylinders 44, from the raised position illustrated in FIG,. 1A and 1B the brush car 30 can be moved along the beams 3 from the position illustrated in FIG. 1A to the right when the brush 37 has been put into a position that the upper side of the rows of blocks 8 will be swept clean by said brush 37. The waste present on the upper side of said rows of blocks 8 will be swept into the bin 38. When the brush car 30 has arrived near a refuse container 47, arranged on the right in FIG. 1B, the receiving bin 38 can be pivoted, so that the waste swept into said bin 38 by the brush 37 can be deposited into the container 47.

After the upper side of the rows of blocks 8 has been swept clean, said rows of blocks can be lifted by the lifting mechanism 10–13 and can be moved upwards to a position above the path of movement of the brush car 30. The brush 37 can then be moved, so that during a subsequent passage of the brush car 30 along the beams 3 the upper side of the kiln car 5 can be swept clean.

Sweeping can take place during the movement of the brush car 30 from the left to the right, seen if FIG. 1A and 1B, as well as during the movement from the right to the left when the correct ratio of the speed of the brush 37 to the rate of displacement of the brush car 30 is chosen.

When the front side of the kiln car 5 has arrived near the device, the arm 41 will be pivoted downwards to the position illustrated on the right in FIG. 7, so that the front side of the kiln car 5, in particular those parts of the kiln car 5 that butt against a kiln car in front during the passage through the kiln, are swept clean well.

When the rear side of the kiln car 5 has arrived near the device, the arm 40 will be pivoted downwards, so that also here the parts that are essential for a good contact between successive kiln cars are swept clean well, as is illustrated on the left in FIG. 7.

When kiln cars 5 are used which are provided with a flat upper side instead of with rows of blocks 8 arranged loosely on the kiln car, the flifting mechanism 10–13 may possibly be left out, so that in that case the device is only equipped with a brush car 30.

I claim:

1. A device for aligning rows of blocks on a kiln car comprising:
   means for blocking the kiln car in a desired position relative to the device;
   an up-and-down movable lifting mechanism;
   clamping means operatively coupled to said lifting mechanism for insertion between the rows of blocks to align them into rows and hold said rows of blocks so that they can be lifted off and placed back on the kiln car by said lifting mechanism with the rows of blocks aligned; and
   frame means separate from said lifting mechanism and separate from said clamping means for engagingly receiving said clamping means at a predetermined location relative to said blocked kiln car and for moving said clamping means transversely to the longitudinal direction of the rows of blocks when the clamping means is inserted between said blocks on said kiln car.

2. A device according to claim 1, wherein the clamping means comprise:
   beams, in a fixed arrangement, which extend parallel to the rows of blocks, and
   clamping parts which are moveable relative to said beams.

3. A device according to claim 2, wherein the moveable clamping parts are moved by inflatable hoses.

4. A device according to claim 3, wherein the inflatable hoses on one side butt against a plate made of flexible material, said plate being fixed at one end and being elastically supported at its other end.

5. A device according to claim 1, wherein the frame means comprises:
   frame parts supporting the lifting mechanism in a lower most position, said frame parts being movable relative to the kiln car in a direction parallel to the direction of movement of the kiln car, to stops having a fixed position in the device.

6. A device according to claim 5, wherein the lifting mechanism is provided with guide rolls which cooperate with the frame parts which are movable relative to the frame means, for positioning the lifting mechanism in a correct position relative to the movable frame parts.

7. An aligning apparatus for aligning rows of blocks on top of a kiln car, comprising;
   a means for positioning the car in a fixed relationship with the apparatus;
   an aligning mechanism for insertion between and for containing rows of blocks on the kiln car;
   lifting means for raising and lowering said aligning mechanism;
   frame means separate from said aligning mechanism and separate from said lifting means for engaging said aligning mechanism when said mechanism is inserted between the rows of blocks, and for moving said aligning mechanism generally parallel to the top of the kiln car and perpendicular to a longitudinal direction of the rows of blocks once the alignment mechanism is inserted between the rows of blocks, so that at least one edge of said aligning mechanism, when moved by said frame means, moves the rows of blocks resting on top of the kiln car adjacent to said edge of said aligning mechanism into alignment, wherein the aligning mechanism is provided with clamping means having beams, in a fixed arrangement which extend parallel to the rows of blocks, and clamping parts which are movable relative to said beams.

8. An apparatus according to claim 7 wherein the movable clamping parts are moved by inflatable hoses.

9. An apparatus according to claim 5 wherein the inflatable hoses on one side butt against a plate made of flexible material, said plate being fixed at one end and being elasticly supported at its other end.

10. An apparatus according to claim 7 wherein the aligning mechanism further comprises:
a lifting mechanism to lift said blocks off of the car when said clamping means clamp the blocks and to replace the blocks on said car in an aligned relationship.

* * * * *

UNITED STATES PATENT AND TRADEMARK OFFICE
CERTIFICATE OF CORRECTION

PATENT NO.   : 4,961,683
DATED        : October 9, 1990
INVENTOR(S)  : Paul J. G. H. van Huet It is certified that error appears in the above-identified patent and that said Letters Patent is hereby corrected as shown below:

```
Column 1, line 34, "blcoks" should read --blocks--.
Column 3, line 44, "shpaed" should read --shaped--.
Column 6, line 13, "flifting" should read --lifting--.
```

Signed and Sealed this

Twentieth Day of October, 1992

*Attest:*

DOUGLAS B. COMER

*Attesting Officer*   Acting Commissioner of Patents and Trademarks